United States Patent [19]
Yanagisawa et al.

[11] Patent Number: 6,028,904
[45] Date of Patent: Feb. 22, 2000

[54] SIGNAL CONVERTING APPARATUS AND METHOD

[75] Inventors: Junichi Yanagisawa; Mitsushige Tatami; Hidetoshi Nishimoto, all of Kanagawa, Japan

[73] Assignee: Sony Corporation, Tokyo, Japan

[21] Appl. No.: 09/007,585

[22] Filed: Jan. 15, 1998

[30] Foreign Application Priority Data

Jan. 17, 1997 [JP] Japan .................................. 9-006520

[51] Int. Cl.⁷ .............................. H04N 9/475; H04L 7/04
[52] U.S. Cl. ........................ 375/372; 348/462; 348/484; 348/512
[58] Field of Search .................................. 375/372, 371, 375/373, 374, 375, 376, 362; 370/467, 469, 474; 348/510, 512, 513, 484, 462, 476, 477, 478, 479, 480, 482, 518, 521, 523; 386/131, 108, 104, 103, 102, 99, 96, 95; 711/100, 101, 111

[56] References Cited

U.S. PATENT DOCUMENTS

| | | | |
|---|---|---|---|
| 5,119,406 | 6/1992 | Kramer | 375/118 |
| 5,452,010 | 9/1995 | Doornink | 348/497 |
| 5,583,894 | 12/1996 | Linsley | 375/372 |
| 5,877,815 | 3/1999 | Tsujimura | 348/515 |

*Primary Examiner*—William Luther
*Attorney, Agent, or Firm*—Frommer Lawrence & Haug, LLP.; William S. Frommer

[57] ABSTRACT

Described herein is the converting between a component SDI signal D1 and a composite SDI signal D2. A single memory is prepared. Further, the corresponding signal is written into the memory in accordance with a clock corresponding to a transfer rate of the SDI signal D1 and the corresponding signal is read from the memory in accordance with a clock corresponding to a transfer rate of the SDI signal D2. The digital signal read from the memory is re-distributed based on header information added to the SDI signal D2. Pieces of header information (ADF, DID, DBN, DC and CS) corresponding to conversion modes are added to the outputted digital signal. Thus, the cost down to the signal converting can be achieved by providing a single signal conversion memory alone and reducing signal conversion memories and their peripheral circuits.

3 Claims, 9 Drawing Sheets

F I G. 2
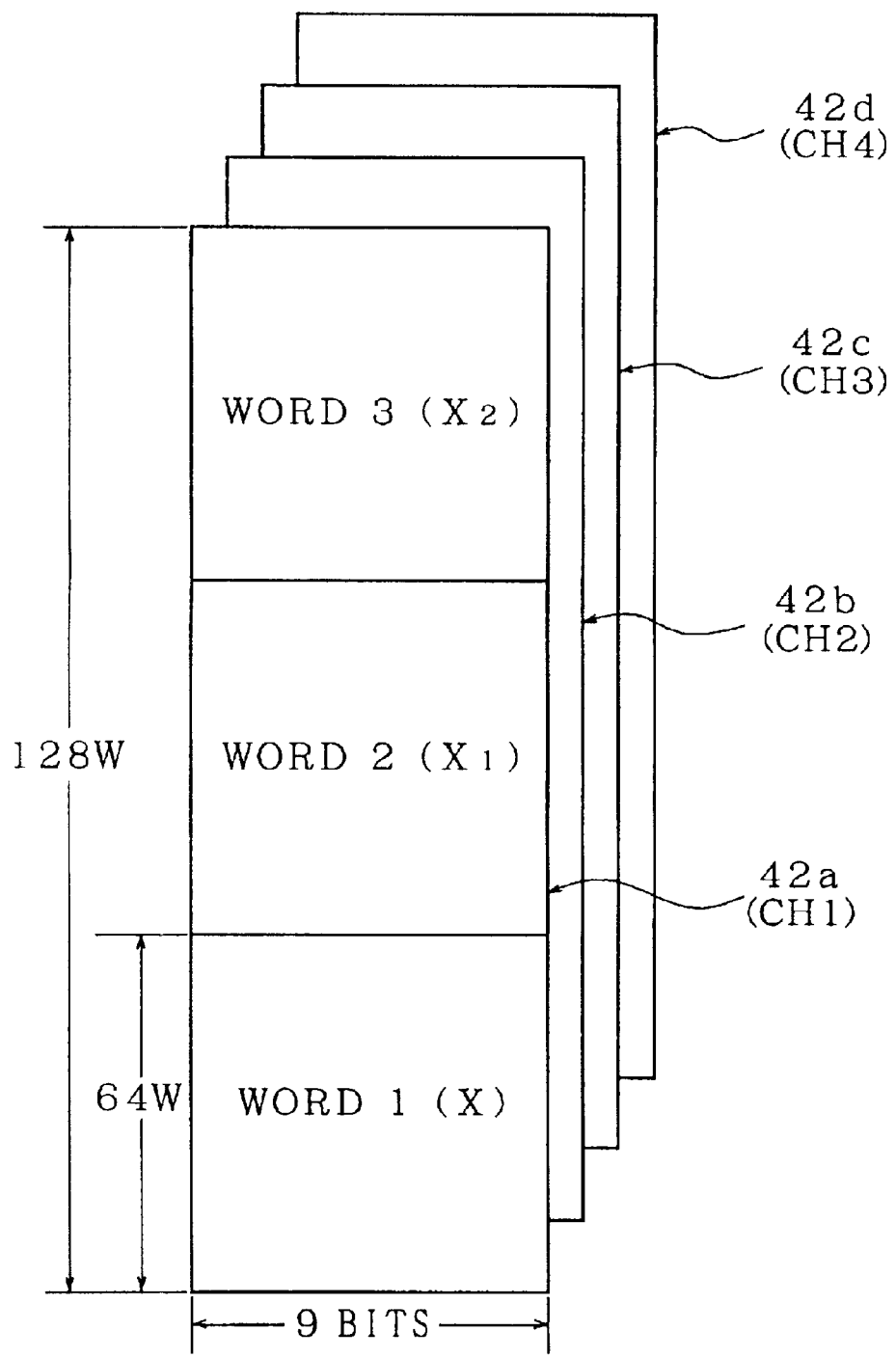

FIG. 6A
(Prior Art)
FIG. 6B
(Prior Art)
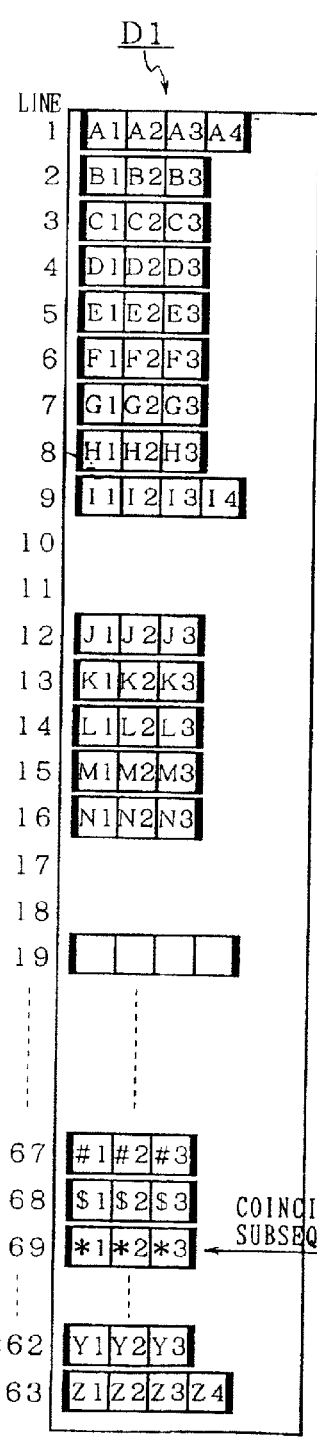
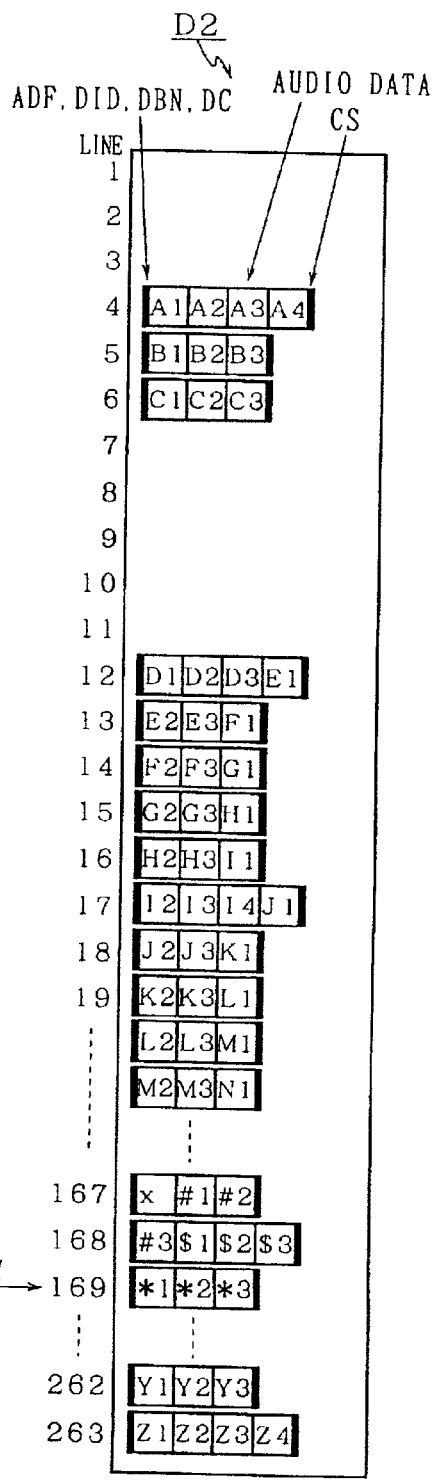

SIGNAL CONVERTING APPARATUS AND METHOD

BACKGROUND OF THE INVENTION

1. Field of the Invention

This invention relates to a digital signal converting apparatus. This invention relates specifically to a signal converting apparatus intended for audio signals superimposed on auxiliary signal areas for video signals as digital signals and capable of reducing its circuit scale upon mutual conversion of the digital audio signals between a component digital video signal format D1 and a composite digital video signal format D2.

2. Description of the Related Art

In video-signal digital series transmission, auxiliary signals can be transmitted utilizing a video flyback or retrace time. When the digital audio signals of these, which are defined by AES/EBU (Audio Engineering Society/European Broadcasting Union), are transmitted using auxiliary signal transmission areas of digital series interfaces (SDI) for a composite digital video signal D2 and a component digital video signal D1, areas for digital audio signals capable of being superimposed on digital video signals have been defined under SMPTE272 standards.

FIG. 4 shows diagonally-shaded signal areas capable of superimposing a composite video signal of a D2 type (4 fsc, 525 lines/60 Hz) thereon. A first field F1 and a second field F2 are illustrated in the same drawing and specific lines for their horizontal and vertical blanking intervals or periods are defined as auxiliary signal areas. The digital audio signal superimposed on each of the auxiliary signal areas will hereinafter be called "composite SDI signal D2".

FIG. 5 shows an example on which a component video signal of a D1 type (4:2:2, 525 lines/60 Hz) is superimposed. A digital audio signal is superimposed on each diagonally-shaded area in the auxiliary signal area. The digital audio signal at this time will be called "component SDI signal D1".

A signal system shown in FIG. 4 is different from that shown in FIG. 5 in auxiliary signal area range. Even in the case of the same lines, they are different from each other in the number of insertable words W. The maximum number of insertable words is represented as shown in the drawing. Only one fields are respectively represented as shown in FIGS. 6A and 6B with audio samples (channels) of inserted audio signals as units.

FIG. 6A shows an example of a component SDI signal D1 and FIG. 6B illustrates an example of a composite SDI signal D2. Even if 1st to 167th lines are the same, they are insertion prohibiting lines or different from each other in the number of data insertable into each line. Therefore, the audio data precisely identical to each other will not be inserted into the lines as shown in the drawing. Thus, the data is distributed to the lines extending up to the 167th line while the lines are being associated with one another. However, the same audio data is inserted into the same lines 168th line or later.

Packet formats of these SDI signals D1 and D2 will now be shown in FIGS. 7 and 8. FIG. 7 shows an example of the packet format for the component SDI signal D1, which consists of audio data and header information arranged in a stage prior to the audio data. The header information consists of four types of headers. ADFs (Ancellary Data Flags) indicate data comprised of three words indicative of the start of each auxiliary signal inserted into a video signal. 000h, 3FFh and 3FFh are used as ADF codes.

A DID (Data Block No) indicates data comprised of one word for identifying the type of audio data, which represents the type of audio group (group 1 to group 4). The audio group is made up of four channels, which are arranged in pairs as in the case of (channel 1 and channel 2) and (channel 3 and channel 4).

A DBN (Data Block Number) indicates a number expressed in one word, which is added to indicate continuity of the audio data within the same channel. As the number, 0 or 1 to 255 are repeated.

A DC (Data Count) indicates the number of words in audio data held within one audio data packet and is comprised of one word.

A CS (Check Sum) indicates data comprised of one word for verifying the effectiveness of audio data and is arranged at the end of the audio data packet.

The audio data consists of three words (respective one words of x, x1 and x2) in a 30-bit configuration. Of these, 20 bits correspond to actual audio data and the remaining bits are comprised of added data (V, U, P and C), a sink flag Z indicative of a start point of an AES audio block, etc.

In the case of the composite SDI signal D2, the ADF consists of one word (3FC). FIG. 8 shows a packet format for the composite SDI signal D2. The composite SDI signal D2 is different from the component SDI signal D1 in that the ADF indicative of the start of the auxiliary signal is made up of one word (code: 3FC) without being comprised of three words and the number of the samples held within the audio data packet is only four (=1 audio group) as distinct from the component SDI signal D1.

In the case of the component SDI signal D2 as shown in FIG. 5, the number of words per line, which can be inserted into each auxiliary signal area, is 268, whereas in the case of the composite SDI signal D1, the number of words per line is 55.

Thus, in order to mutually output the two SDI signals D1 and D2 different from each other in header information and audio packet contents in a state in which their modes or formats have been converted to one another, a signal converting apparatus 10 shown in FIG. 9 is considered to be used.

The signal converting apparatus 10 comprises a first conversion unit 10A and a second conversion unit 10B. An SDI signal D2 supplied to a terminal 12 is converted into a parallel signal represented in the form of 10 bits per word by a serial/parallel converter 14, which in turn is stored in a memory means 16. Therefore, the parallel signal is supplied to a header information discriminator 18 where header information such as a packet start point, determination of an audio group, the number of data words, etc. is detected and determined. Whether or not either type of the SDI signals D1 and D2 is inputted, may refer to an ADF code.

Since a transfer rate of 270 Mbps is used when the composite SDI signal D2 is inputted, a write address generator 20 generates a write clock of 27 MHz. Thus, the composite SDI signal D2 is written into the memory means in accordance with the generated write clock. Data to be written may be written therein only as audio data or may be written inclusive of partial header information. When, on the other hand, the component SDI signal D1 is inputted, its transfer rate is 144 Mbps and hence a write clock and a write address corresponding thereto are generated from the write address generator 20.

A read address generator 22 generates a sampling clock frequency, e.g., 44.1 kHz of audio data. The data stored in the memory means 16 is read out with the sampling clock frequency as a read clock.

The read parallel data is supplied to a second memory means 30 provided within the second conversion unit 10B so that the parallel data is written therein. A clock of 44.1 kHz generated from a write address generator 32 is used as a write clock. Further, a read address generator 34 generates a clock (27 MHz/14.4 MHz) identical to that for the transfer rate (270Mbps or 144 Mbps) to be converted. Memory data is read from the second memory means 30 using the generated clock. At this time, the state of reading of the audio data is controlled so as to make the arrangement of data for the lines shown in FIG. 6.

The read data is supplied to a synthesizer 36. A header information generator 38 generates header information (ADF, DID, etc.) employed in the component SDI signal D1 or the composite SDI signal D2 to be converted. The generated header information is added to the synthesizer 36 to obtain the component SDI signal D1 (and composite SDI signal D2) shown in FIGS. 7 and 8, which in turn is outputted from a terminal 40.

When the signal converting apparatus 10 is now configured as shown in FIG. 9, it is necessary to prepare the memory means 16 and 30 corresponding to the first and second conversion units 10A and 10B respectively. Further, since the read address generator 22 and the write address generator 32 corresponding to these memory means 16 and 30 must be prepared in addition to the above memory means, the signal converting apparatus 10 will result in an increase in its circuit scale and the cost is increased.

SUMMARY OF THE INVENTION

With the foregoing in view, it is therefore an object of the present invention to provide a signal converting apparatus capable of reducing its circuit scale to thereby achieve the cost down to the signal converting apparatus.

According to one aspect of the present invention, for achieving the above object, there is thus provided a signal converting apparatus comprising:

memory means for inputting a first digital signal therein and outputting a second digital signal therefrom;

memory control means for writing the first digital signal into the memory means in response to a clock corresponding to a transfer rate of the first digital signal, reading the second digital signal from the memory means in response to a clock corresponding to a transfer rate of the second digital signal and outputting the same therefrom; and re-distribution control means for controlling the second digital signal outputted from the second memory means so as to be distributed to a predetermined area.

According to this invention, digital audio data is converted into a predetermined signal format using a single memory means. Therefore, a clock identical to that for a transfer rate of an input SDI signal is used as a write clock, whereas a clock identical to that for a transfer rate of a converted SDI signal to be outputted is used as a read clock.

Further, the state of reading of audio data is controlled so that the audio data is held within an audio data packet identical to the SDI signal to be outputted. Moreover, header information used for the SDI signal to be outputted is additionally provided. The input SDI signal is in asynchronism with the SDI signal to be outputted.

Owing to such a construction, a signal converting process can be carried out in a comparatively simple configuration. This signal conversion can be applied even to the conversion from the composite SDI signal D2 to the component SDI signal D1 and the conversion from the component SDI signal D1 to the composite SDI signal D2.

According to another aspect of the present invention, for achieving the above object, there is provided a signal converting method comprising the following steps:

a first step for inputting a first digital signal therein and writing the first digital signal into memory means in response to a first clock corresponding to a transfer rate of the first digital signal;

a second step for reading the first digital signal written into the memory means in the first step from the memory means in response to a second clock different from the first clock; and a third step for controlling a second digital signal read in the second step so as to be distributed to a predetermined area.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is a map structure diagram illustrating one example of a configuration of a memory means;

FIGS. 6A and 6B are respectively diagrams illustrating examples of the distribution of audio data in a component SDI signal and a composite SDI signal;

DETAILED DESCRIPTION OF THE PREFERRED EMBODIMENTS

One embodiment of a signal converting apparatus according to the present invention will hereinafter be described in detail with reference to FIG. 1 and drawings subsequent thereto. The present embodiment will be explained on the basis of the conversion of the audio signal, particularly, the component SDI signal D1 to the composite SDI signal D2 as described above.

Figure 1:
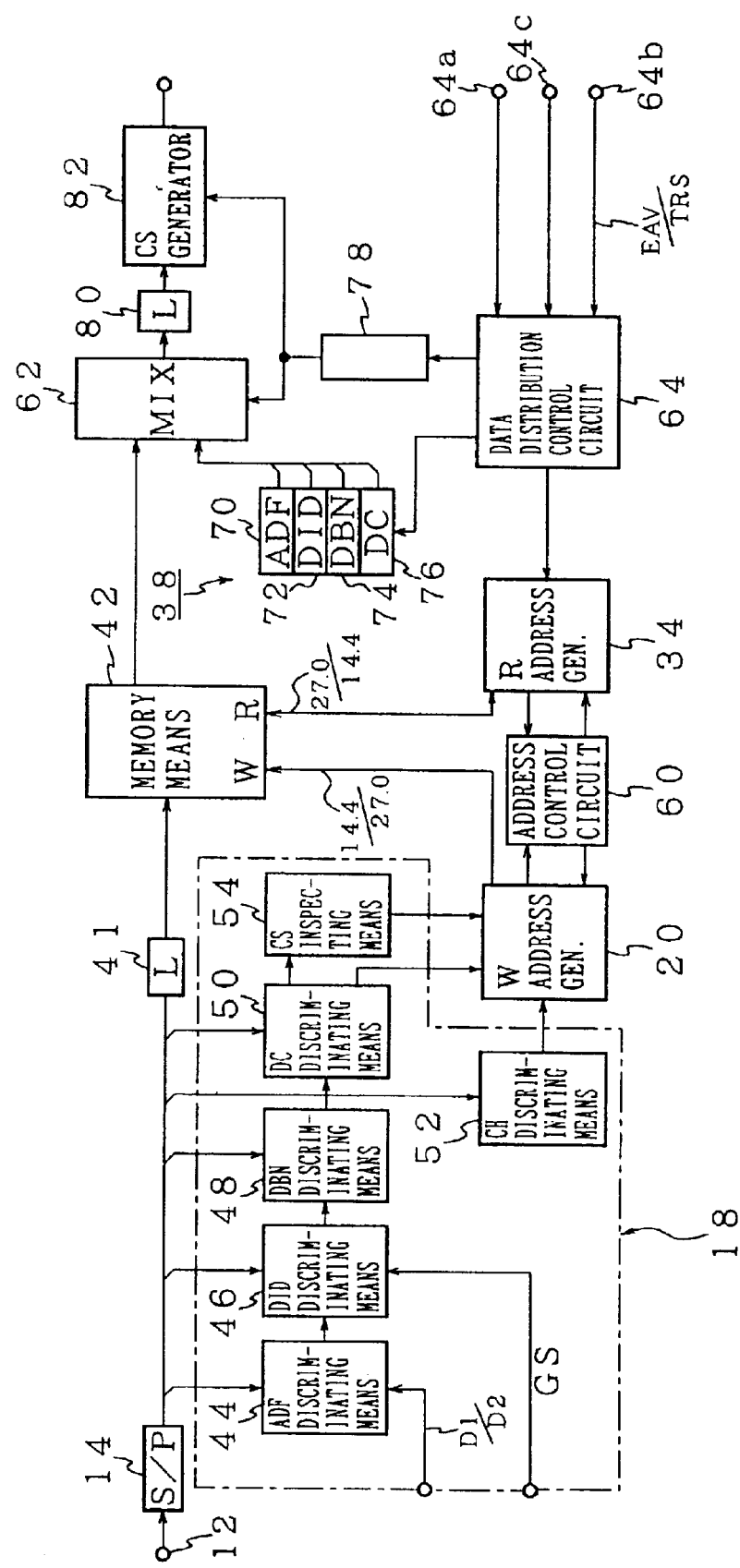
FIG. 1 is a fragmentary systematic diagram showing a signal converting apparatus according to the present invention, which is applied to a component signal converting system.

As shown in FIG. 1, a component SDI signal D1 supplied to a terminal 12 is converted from a serial signal to a parallel signal represented in the form of 10 bits per word by an S/P converter 14. The converted signal is supplied to a memory means 42 through a latch circuit 41 and then even to a header information discriminating means 18.

Figure 7:
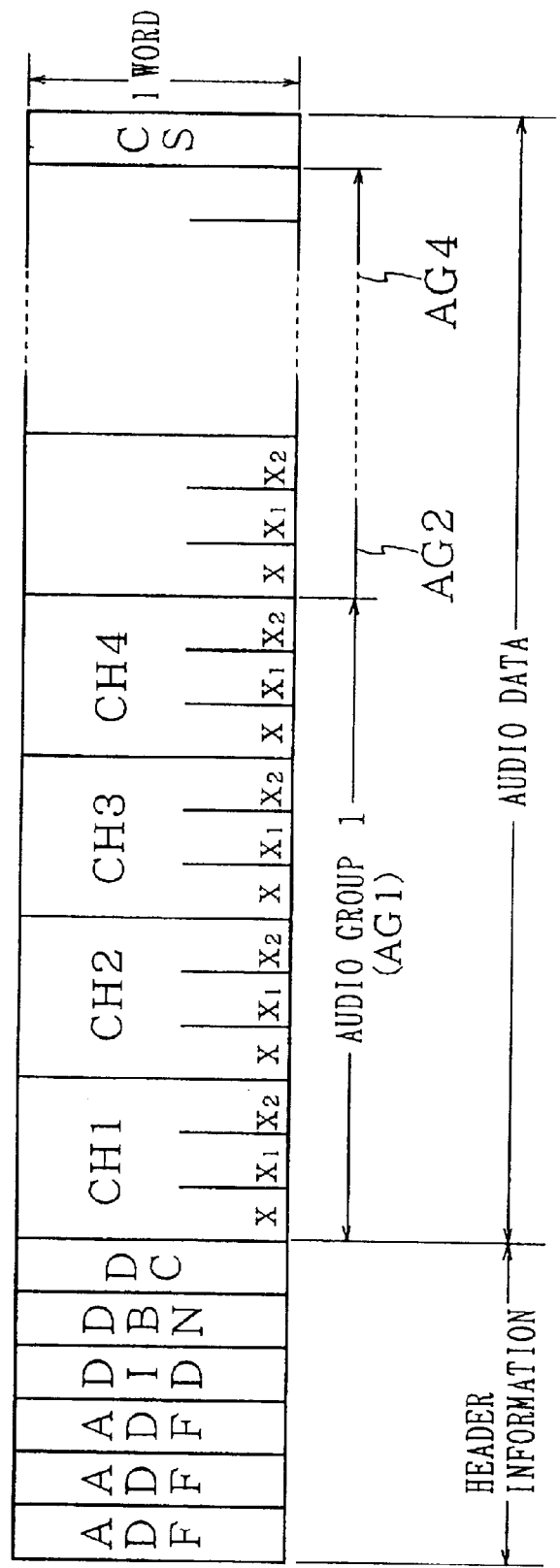
FIG. 7 is a diagram showing a packet format of a composite SDI signal.

The header information discriminating means 18 determines or discriminates between various header codes shown in FIG. 7. The parallel signal is first supplied to an ADF code discriminating means 44 where it is determined based on an ADF code whether the input signal corresponds to either the component SDI signal D1 or the composite SDI signal D2. In the present embodiment, an ADF code (comprised of three words of 000h, 3FFh and 3FFh) inserted into the component SDI signal D1 is detected. Incidentally, whether or not one word of 3FCh exists, is determined in the case of the composite SDI signal D2. Therefore, the ADF code discriminating means 44 is supplied with identification data (D1/D2) indicative of whether either of the SDI signals is determined.

When the ADF code is determined, the following-stage DID code discriminating means 46 is brought to an active state according to the determined output to discriminate between audio groups (groups 1 to 4) of the transmitted audio signal. When the group codes have coincided with one another, the DID code discriminating means 46 determines that the input signal is of the audio signal. Further, the audio signal is stored in a memory plain (to be described later) of the corresponding memory means 42 according to the determined audio group.

Since only one audio group is transmitted in the case of the composite signal D2, a group selection code GS corresponding to any of the groups 1 to 4 is supplied from the outside. When the input audio group has coincided with this group selection code GS, data thereof is stored in the corresponding memory means 42. When an auxiliary signal other than the audio signal is transmitted, another discrimination or determination signal is generated. However, since it has no direct bearing on the present invention, its description will be omitted.

If a DID code is determined, then a DBN code is determined by a discriminating means 48. When no continuity exists in a data block, an error signal is outputted so that the memory means 42 is controlled. When other than this case, no particular discrimination output is produced.

A DC code discriminating means 50 checks for the number of words of audio data subsequent to header information and generates a pulse for taking in or capturing the number of the words in the corresponding memory means 42 (actually sets a count value corresponding to the number of the words). As a result, start and stop states for generating addresses for a write address generator 20 to be described later are controlled.

A channel discriminating means 52 determines an audio channel for input data. Since the audio data is transmitted in channel pair as described above, the channel discriminating means 52 reads a channel discrimination code inserted into a first word of respective audio samples and thereby determines to which audio data of channel the channel data corresponds. The determined channel data is supplied to the write address generator 20 so that the corresponding memory plain of the memory means 42 is selected.

Finally, the parallel signal is supplied to a check sum inspecting means 54 where the check sum of the input audio data and parity verification are carried out. When an error is detected, audio data at that time is not used. As a method of detecting the error, the following method is adopted.

When one starts to write audio data into the memory means 42, its leading address is latched and the state of an error in an audio data packet is confirmed when the writing of the data into the memory means 42 has been completed. When no error is confirmed, it still remains. When, on the other hand, the error is detected, the address is returned to the latched leading address. This address operation would result in no writing of the error-detected audio data into the memory means 42.

The write address generator 20 generates a write clock corresponding to a transfer rate of an SDI signal inputted thereto and a write address synchronized with the write clock.

Since the component SDI signal has a transfer rate of 144 Mbps, a write clock and a write address corresponding thereto are generated. Since a transfer rate of 270 Mbps is set when the composite SDI signal D2 is inputted, the write address generator 20 generates a write clock of 27 MHz. Thus, the composite SDI signal D2 is written into the memory means in synchronism with the write clock. Data to be written therein may be written as only audio data or may be written inclusive of partial header information.

FIG. 2 shows a specific example of the memory means 42 employed in one audio group. In the present example, a dual-port type memory is used as the memory means 42. In the example illustrated in FIG. 2, the memory means 42 has memory plains 42a through 42d corresponding to four channels, which have memory regions or areas corresponding to respective words respectively. The two leftmost bits of an address specify or designate words for respective channels. An address of the six rightmost bits is advanced after the writing of three words into the memory means 42. The six rightmost bits are generated by a ring counter (not shown). Data to be written into the memory means 42 is only audio data. Header information or the like is newly added on the reading side.

The write address generator 20 is supplied with the above-described data word detection pulse and channel select signals to be stored in the memory means 42 every channels, and the like. Thus, the control or the like on addresses relative to the memory plains 42a through 42d is carried out according to these.

The audio data read by the memory means 42 is read out in accordance with such a clock as to become the same transfer rate as that for the composite SDI signal to be converted. As the clock for reading the audio data, a clock corresponding to the transfer rate of the SDI signal to be converted is used. When the SDI signal to be converted is of the composite SDI signal D2, a clock of 27 MHz is used, whereas when it is of the component SDI signal D1, a clock of 14.4 MHz is used.

Since reading timing is asynchronized with write timing, an asynchronous signal converting process is executed. However, in order to allow a write address so as not to lag behind a read address, an address control circuit 60 is provided to monitor the write and read addresses, whereby their address generation is controlled so as to avoid its lagging.

Figure 8:
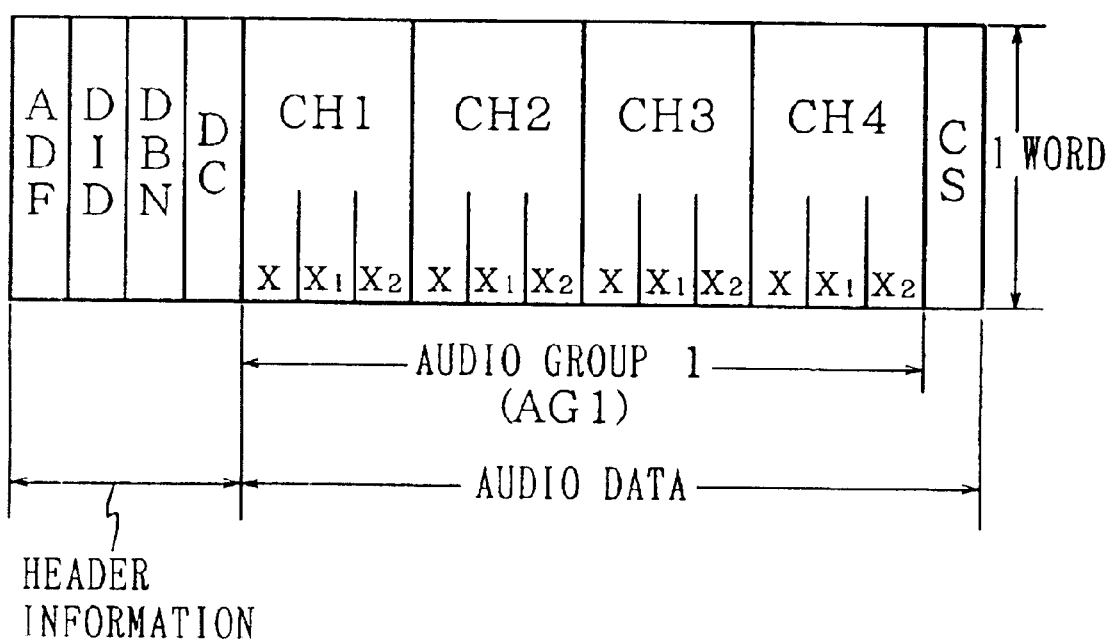
FIG. 8 is a diagram illustrating a packet format of a component SDI signal.
Figure 9:
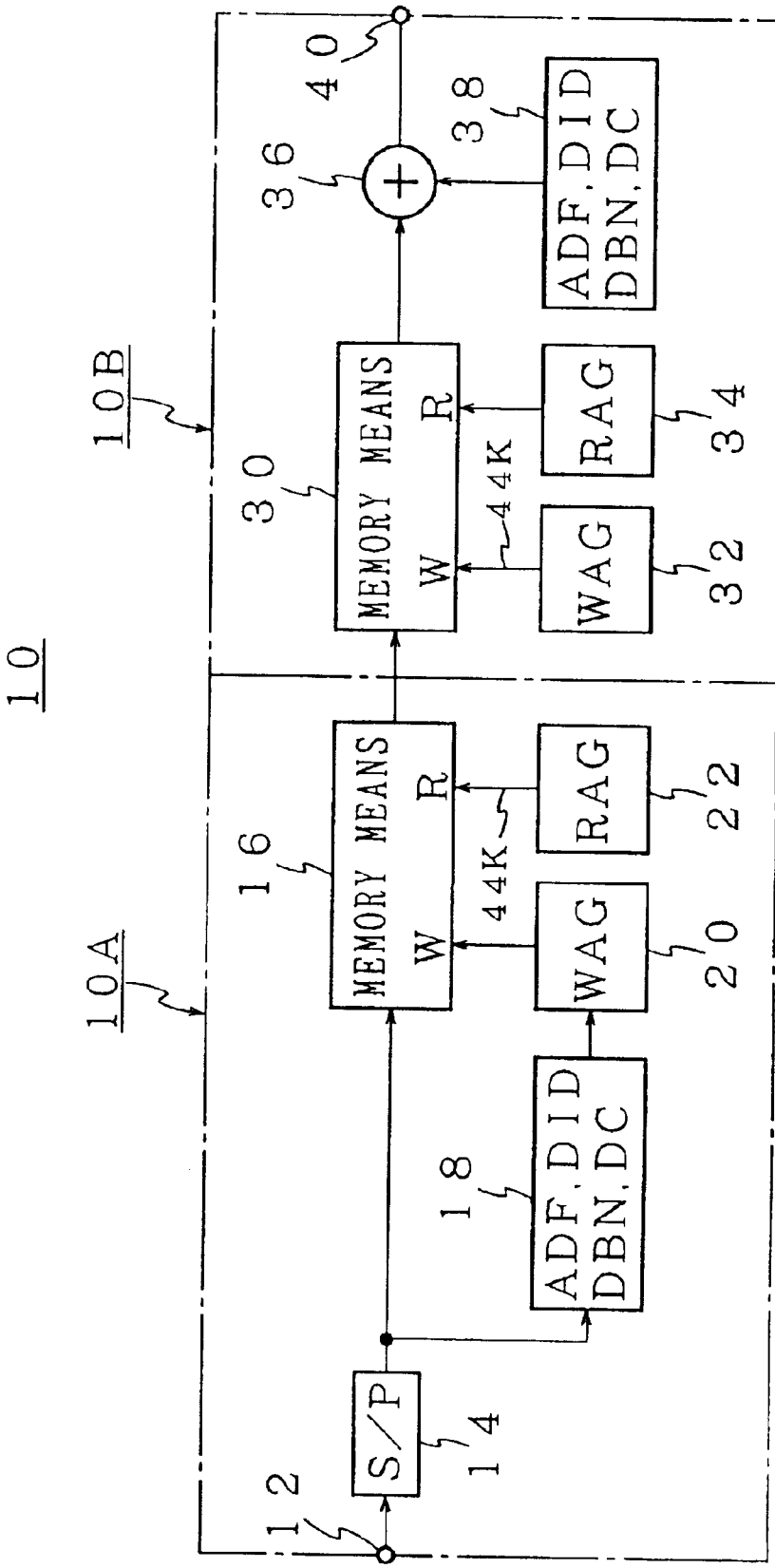
FIG. 9 is a systematic diagram depicting a conventional signal converting apparatus.

The read audio data is supplied to a mixer 62 where various headers supplied from a header information generating means 38 are newly added thereto. The header information generating means 38 adds header information (see FIGS. 7 and 8) corresponding to the SDI signal to be converted, to the mixer 62.

As shown in FIGS. 6A and 6B, an audio data distribution control circuit 64 is provided so that a converted SDI signal can be inserted into auxiliary signal areas allowed for the SDI signal to be converted, in line units. The audio data distribution control circuit 64 is supplied with a frame signal from a terminal 64a and an EAS signal or a TRS signal indicative of the start of each auxiliary signal area from a terminal 64b. In addition to these, a line signal is supplied to the audio data distribution control circuit 64 through a terminal 64c. When the signal to be converted corresponds to the component SDI signal D1, an EAV signal indicative of the end of a picture or image is supplied in place of the TRS signal.

Therefore, the audio data distribution control circuit 64 performs control corresponding to the SDI signal to be converted. Since the SDI signal to be converted is known in advance, whether or not the SDI signal to be converted should be converted into any signal form, can be set even if either of manual and automatic methods is used. The audio data distribution control circuit 64 identifies data-inserted lines and data-noninserted lines based on the signals supplied from the terminals 64a through 64c and determines the number of audio samples (corresponding to word units) to be inserted into the lines for data insertion. Thus, the audio data distribution control circuit 64 performs control for newly adding header information necessary for them.

Figure 4:
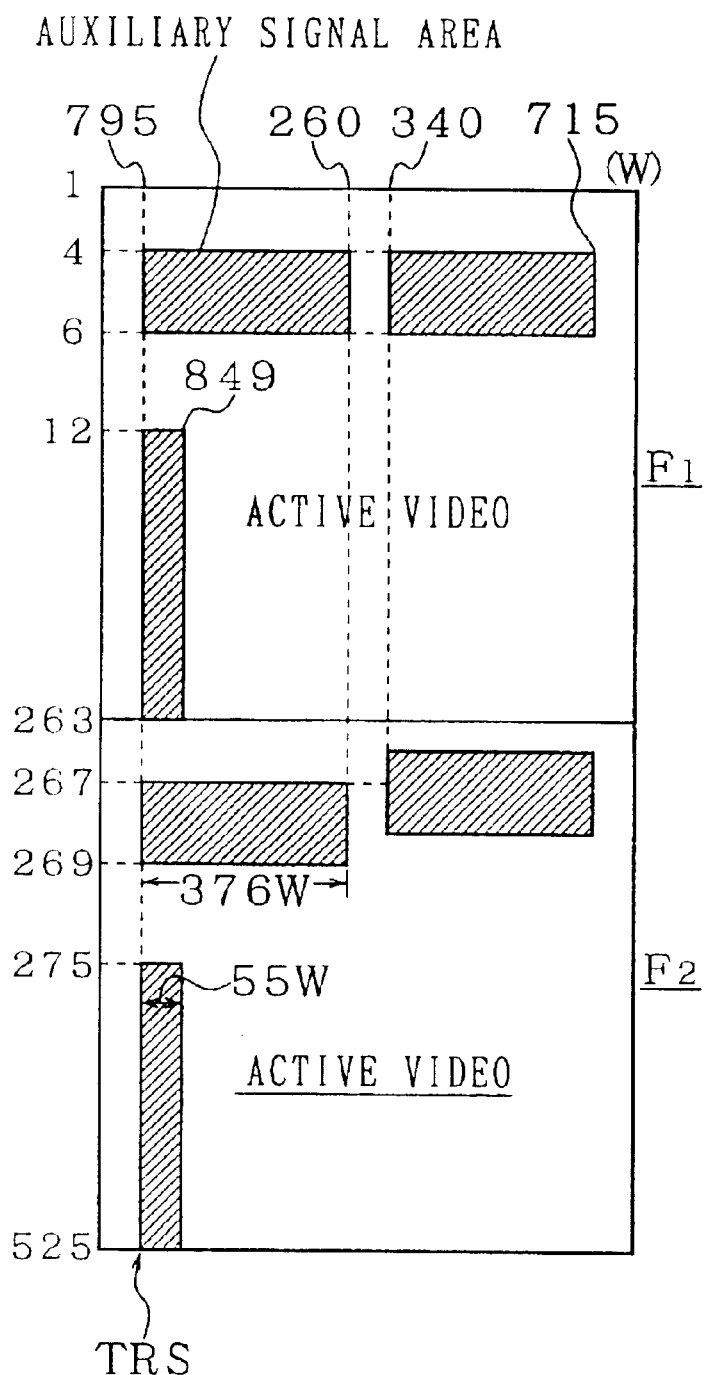
FIG. 4 is a diagram depicting a multiple area for audio data defined by SMPTE272M.

The lines to avoid the insertion of audio data therein include 1st to 3rd lines, 7th to 11th lines, 264th to 266th lines and 270th to 274th lines in the case of the composite SDI signal D2 shown in FIG. 4. In the case of the component SDI signal D1, the lines to avoid the insertion of the audio data therein include respective two lines of 10th to 11th lines and 273rd to 274th lines.

When an EAV signal (TRS signal) indicative of a data insertion start point is inputted to the audio data distribution control circuit 64 where the signal to be converted corresponds to the component SDI signal D1 (or composite SDI signal D2), the audio data distribution control circuit 64 supplies an insertion timing control signal to the header information generating circuit 38 to incorporate header information therein. The addition of the header information is determined according to a packet format to be outputted.

Thus, when the signal to be converted indicates the component SDI signal D1, the ADF code comprised of three words (000h, 3FFh and 3FFh) is generated from an internally-provided ADF code generator 70, a reconstructed DID code is produced from a DID code generator 72 and continuous new block numbers (1 to 255) are generated from a DBN code generator 74 every audio data packets. They are outputted as DBN codes. Further, a DC code generator 76 computes the number of samples (corresponding to the number of words) insertable into a newly-produced line and outputs the corresponding number of samples as a DC code. They are inserted in front of the read audio data. The value of the DC code is computed by the audio data distribution control circuit 64 and a DC code corresponding to the computed value is set by the DC code generator 76.

Further, the timing provided to read the audio data from the above-described memory means 24 is also based on the reference signal TRS (EAV). A specific read control operation of the memory means 42 will be explained later.

After the headers and the audio data are synthesized in output format order of the SID signal D2 to be converted, their data is latched in a latch circuit 80 and supplied to a check sum generator 82 provided in a stage posterior to the latch circuit 80, where a check sum CS is calculated again. In the check sum generator 82, the sum of the nine rightmost bits of data from the DID code to immediately before the check sum is recalculated and the value thereof is added to the end of audio data as a check sum value. By performing the above-described converting operation, the SDI signal (corresponding to the composite SDI signal D2 or component SDI signal D1) constructed in the form of 10 bits per word in accordance with the format shown in the drawing is outputted.

The memory means 42 calculates the number of samples to be outputted from the difference between the write address and the read address. The number of the samples is set to four at maximum. However, the read address is controlled in such a manner that the four samples are outputted every 5 or 6 lines without being continuously outputted. Controlling the number of read samples is performed to avoid the output of the number of samples greater than the power of conversion into an analog signal by a DA converter unillustrated in FIG. 1. Its specific flowchart will be shown in FIG. 3.

Figure 3:
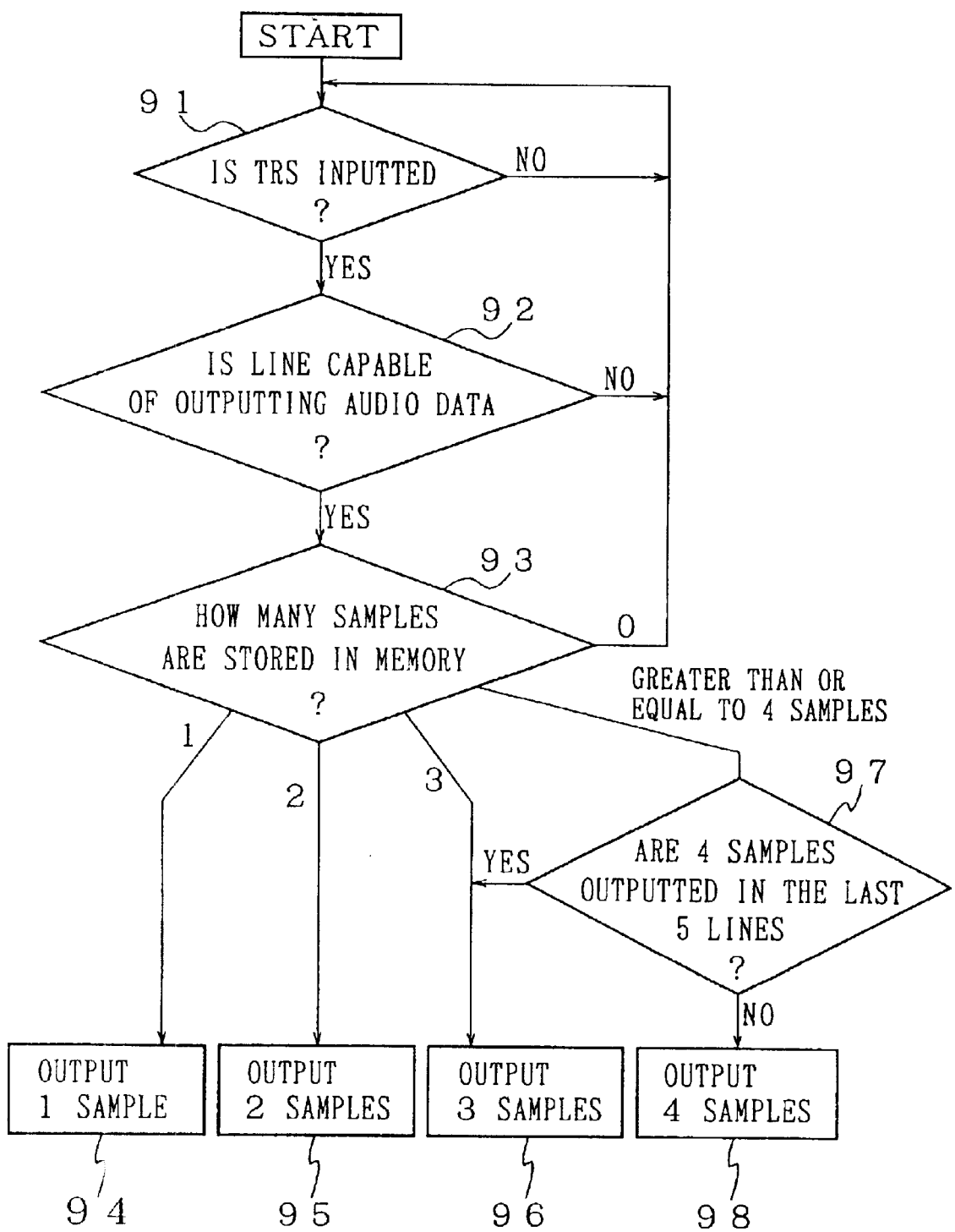
FIG. 3 is a flowchart for describing one example of the reading of data.

When the input of the TRS signal (EAV signal) is confirmed in FIG. 3, it is determined whether or not the intended line corresponds to a line capable of outputting audio data (Steps 91 and 92). If the intended line is found not to be an insertion prohibiting line in Step 92, then the number of samples in the audio data stored in the memory means 42 is determined (Step 93).

When the audio data equivalent to the number of the samples corresponding to one is stored in the memory means 42, the audio data corresponding to one sample is read out (Step 94). When the audio data equivalent to the number of the samples corresponding to two is stored therein, the audio data corresponding to two samples is read out (Step 95). When the audio data equivalent to the number of the samples corresponding to three is stored therein, the audio data corresponding to three samples is read out (Step 96).

Further, when the audio data greater than or equal to the number of the samples corresponding to four is stored therein, it is determined whether the audio data corresponding to four samples has been outputted in the last five years (Step 97). If such a history does not exists, then the audio data corresponding to the four samples is read (Step 98). If not so, then the audio data corresponding to three samples is read.

Figure 5:
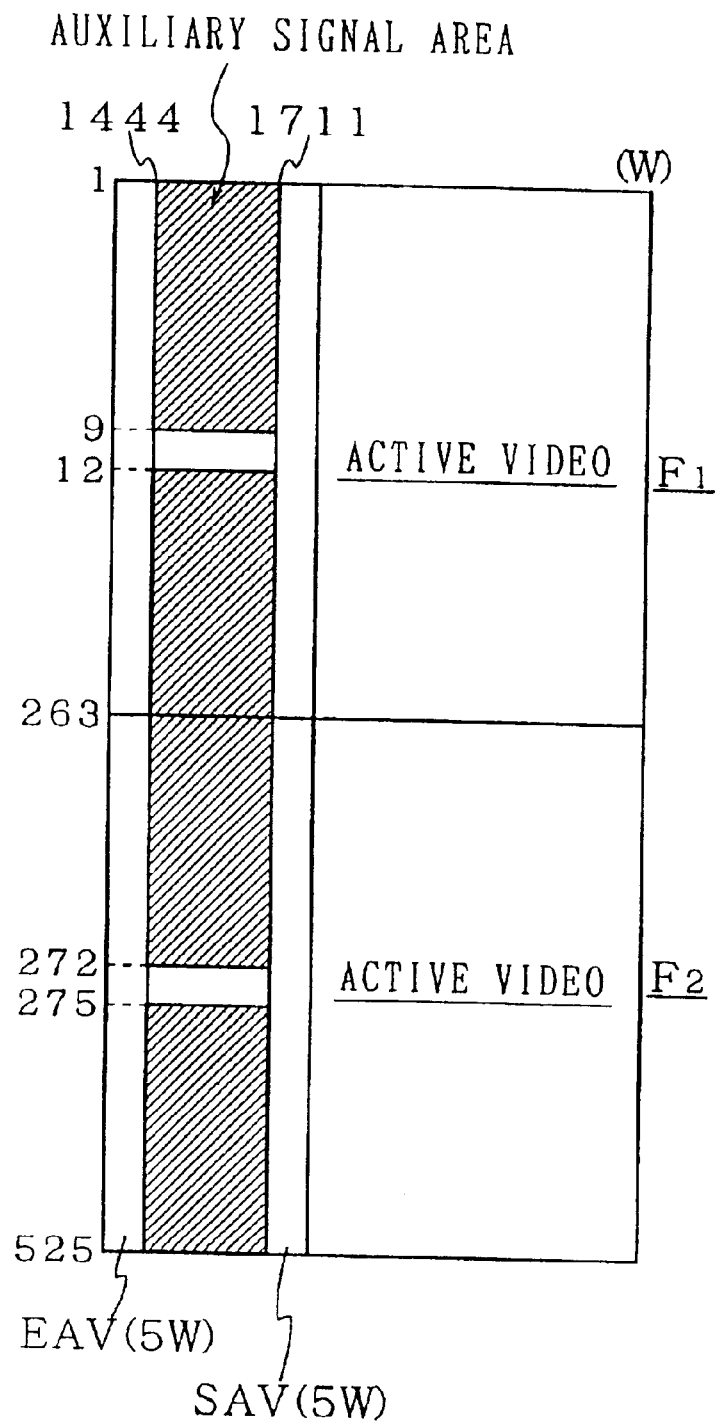
FIG. 5 is a diagram showing another multiple area for audio data defined by SMPTE272M.

Thus, the control of the number of the read samples and the adjustment of the number of the samples inserted while the line to insert the data therein is being judged, allows acquisition of the SDI signal (component SDI signal D1/composite SDI signal D2) represented in the audio data packet format shown in FIG. 4 or FIG. 5.

The aforementioned embodiment has described the case in which both the component SDI signal D1 and the composite SDI signal D2 can be brought into conversion. However, the present embodiment may be configured as dedicated equipment as an alternative to it. In other words, the signal converting equipment or apparatus according to the present invention may be constructed as a dedicated signal converting apparatus for converting to the component SDI signal or a dedicated signal converting apparatus for converting to the composite SDI signal D2. In this case, a write address generating circuit 20 generates a write address from a single clock and a read address generating circuit 34 also generates a read address from the single clock. A header information generating means 38 and a data distribution control circuit 64 are also both provided in dedicated configurations respectively.

The aforementioned embodiment has described the signal converting process based on SMPTE272M standards. It is however apparent that the present invention can be applied even to a process for converting to signal formats (such as a format for 17.7 Mbps, etc.) based on a recommendation other than it.

In the aforementioned embodiment, the data to be written into the memory means 42 has been used as the audio data. However, the data maybe either video data or header information. Even if data obtained by weighting all of audio data, video data, header information and other data is written, the present invention can be applied without any problems.

In the present invention as has been described above, the signal-format converting process can be implemented using the single memory means.

According to this, the memory means can be reduced in number by using the single memory means alone. Further, peripheral circuits for driving the memory means become unnecessary with the reduction in number. Therefore, the present signal converting apparatus has an advantageous feature in that its circuit scale can be reduced as a whole. With its reduction, the cost down to the signal converting apparatus can be also achieved.

Thus, the present invention is extremely suitable for use in video-device facilities such as a broadcasting station, a production house, etc. which need mutual conversion between the composite SDI signal and the component SDI signal.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A signal converting apparatus comprising:

memory means for inputting a first digital signal therein and outputting a second digital signal therefrom;

memory control means for writing the first digital signal into said memory means in response to a clock corresponding to a transfer rate of the first digital signal, reading the second digital signal from said memory means in response to a clock corresponding to a transfer rate of the second digital signal and outputting the same therefrom; and re-distribution control means for controlling the second digital signal outputted from said memory means so as to be distributed to a predetermined area said redistribution control means comprising:

header information generating means for generating auxiliary data header information, MIX means for mixing the second digital signal output from the memory means and the auxiliary data header information output from the header information generating means so as to produce the distributed signal in the predetermined area;

latch means for receiving the distributed signal, the latch means output being supplied to a check sum generator means provided in a stage posterior to the latch means;

data distribution control means for controlling the number of distributed data per line for the distributed digital signal by providing control signaling to each of the header information generating means, the Mix means, and the check sum generator means.

2. A signal converting apparatus according to claim 1, wherein said first and second digital signals are digital audio signals superimposed on corresponding auxiliary signal areas for a composite serial data interface signal and a component serial data interface signal and said predetermined area corresponds to each of the auxiliary signal areas, and said re-distribution control means controls second digital signal so as to be distributed to the auxiliary signal areas.

3. A signal converting method comprising the following steps:

a first step for inputting a first digital signal therein and writing the first digital signal into memory means in response to a first clock corresponding to a transfer rate of the first digital signal;

a second step for reading the first digital signal written into said memory means in said first step from said memory means in response to a second clock different from the first clock; and a third step for selecting the number of distributed data per lines for the second digital signal distributed to an auxiliary signal area;

a fourth step for controlling the second digital signal so as to be distributed to the auxiliary signal area according to the distributed number selected from the third step.

* * * * *